United States Patent [19]
Barile et al.

[11] Patent Number: 5,977,886
[45] Date of Patent: Nov. 2, 1999

[54] SYSTEMS AND METHODS FOR COMMUNICATING BETWEEN A USER INPUT DEVICE AND AN APPLICATION USING ADAPTIVELY SELECTED CODE SETS

[75] Inventors: John Barile, Apex; Carlos Vidales, Raleigh; Brian Miller, Durham; Joseph Morris, Chapel Hill, all of N.C.

[73] Assignee: Ericsson Inc., Research Triangle Park, N.C.

[21] Appl. No.: 08/949,247

[22] Filed: Oct. 10, 1997

[51] Int. Cl.$^6$ ..................................................... H03K 17/94
[52] U.S. Cl. .............................. 341/20; 341/22; 341/176; 345/168; 455/90
[58] Field of Search ............................... 341/20, 22, 173, 341/176, 26; 345/168; 364/707; 455/90

[56] References Cited

U.S. PATENT DOCUMENTS

| | | | |
|---|---|---|---|
| 5,606,594 | 2/1997 | Register et al. | 455/90 |
| 5,625,673 | 4/1997 | Grewe et al. | 455/90 |
| 5,778,256 | 7/1998 | Darbee | 341/176 |

FOREIGN PATENT DOCUMENTS

| | | |
|---|---|---|
| 0 133 474 A2 | 2/1985 | European Pat. Off. |
| WO 94/22225 | 9/1994 | WIPO |

OTHER PUBLICATIONS

International Search Report, PCT/US98/20447, Feb. 22, 1999.
Abramson, "Information Theory and Coding", McGraw–Hill Book Company, pp. 76–83 No Date.
Hines et al., "Probability and Statistics in Engineering and Management Science", John Wiley & Sons, pp. 299–304 No Date.

*Primary Examiner*—Michael Horabik
*Assistant Examiner*—Timothy Edwards, Jr.
*Attorney, Agent, or Firm*—Myers Bigel Sibley & Sajovec

[57] ABSTRACT

A user input is communicated to an application resident on a data processing system according to a code set which is adaptively selected in response to the application, the selected code set mapping to a respective set of corresponding user inputs, the selected code set optimizing a performance parameter for communicating between a user input device and the application. The selected code set may be selected from a stored plurality of code sets. Preferably, the selected code set minimizes energy expended in communicating codes from the user input device to the data processing system. According to one aspect, the application may first be identified, and then the selected code set may be selected according to the identified application. According to another aspect, a plurality of user inputs to the application may be accepted at the user input device and recorded, and the selected code set may be selected based on the recorded plurality of user inputs.

59 Claims, 5 Drawing Sheets

SYSTEMS AND METHODS FOR COMMUNICATING BETWEEN A USER INPUT DEVICE AND AN APPLICATION USING ADAPTIVELY SELECTED CODE SETS

FIELD OF THE INVENTION

The present invention relates to data processing systems and methods, more particularly, to systems and methods for communicating a user input to an application resident on a data processing system such as a personal computer, network computer, video device, and the like.

BACKGROUND OF THE INVENTION

Typically, a keyboard used as a user input device for an application resident on a data processing system, e.g., a program running on a personal computer (PC), a personal digital assistant (PDA) or the like, includes electronic circuits which scan a matrix of switches actuated by the keys to determine the row and column of the depressed key. The row and column values then are mapped to a corresponding binary keycode which may then be transmitted to the data processing system. The keycode may be communicated from the user input device to the data processing system via wires, radio signals, infrared signals and other communication techniques. Keycodes may be standardized, such as the standard codes used to communicate between keyboards and PCs to ensure compatibility.

Although keyboard data entry is commonly used in data processing systems such as desktop and portable PCs, it may also be desirable for smaller portable devices such as PDAs and portable intelligent communicators (PICs). Both wired and wireless interfaces may be employed between a user input device and the data processing system. In portable devices such as PDAs and PICs, and in wireless keyboard applications for desktop or portable systems, power consumption may be a critical issue, as portable systems and wireless user input devices typically are battery-powered to increase their portability. Accordingly, these devices tend to be limited by the energy storage capability of the batteries used in the devices.

A typical keyboard entry application such as a word processor can involve processing of a large number of keystrokes in a short period of time. Accordingly, a large number of keycodes may need to be transmitted in a short time, which can lead to significant energy consumption in communicating between the keyboard and the application. For example, a wireless infrared keyboard typically transmits keycodes by modulating an infrared transmitter which is powered by a battery or similar power source included in the keyboard. The infrared transmitter typically consumes significant power when it is illuminated or "on." If the transmitter is frequently on, a greater amount of battery power may be consumed. In addition, high frequency switching of components which drive the transmitter may increase energy consumption by the keyboard. Accordingly, generation of a stream of keycodes which requires the infrared transmitter to be on for significant periods of time and which requires frequent switching of the transmitter can quickly exhaust the power source of the keyboard. Accordingly, there is a need for more energy efficient systems and methods for communicating user inputs from portable input devices such as wireless keyboards.

SUMMARY OF THE INVENTION

In light of the foregoing, it is an object of the present invention to provide more energy efficient systems and methods for communicating a user input to an application resident on a data processing system.

This and other objects, features and advantages are provided according to the present invention by systems and methods for communicating a user input to an application resident on a data processing system, in which a user input accepted at a user input device is communicated using a code which is a member of a code set which is adaptively selected to optimize a performance parameter for communicating user inputs to the application, preferably a code set which minimizes power expended in communicating from the user input device to the data processing system upon which the application is resident. The code set may be adaptively selected from a plurality of predetermined code sets based on the application. The code set may also be selected by recording a plurality of user inputs to the application and adaptively selecting a code set from a predetermined set of codes based on the recorded inputs.

The present invention arises from the realization that use of a particular code set, e.g., a particular keycode set, for communication between a user input device and a variety of applications, e.g., word processors, spreadsheets and the like, may have different energy consumption characteristics associated therewith depending on the application. For example, a user input device may utilize keycodes for an English-text word processing application in a different fashion than for a word processing application in a different language or a specialized text processing application such as a computer program editor. Consequently, assuming a fixed keycode set is used, each of these applications may have different levels of energy consumption associated therewith. Accordingly, improved utilization of limited power resources can be achieved according to the present invention by adaptively selecting a code set which is matched to the application being used.

In particular, according to the present invention, a user input is communicated to an application resident on a data processing system according to a code set which is adaptively selected in response to the application, the selected code set mapping to a set of corresponding user inputs, the selected code set optimizing a performance parameter for communicating between a user input device and the application. The selected code set may be selected from a stored plurality of code sets. Preferably, the selected code set minimizes energy expended in communicating codes from the user input device to the data processing system. According to one aspect, the application is first identified, and then the selected code set is selected according to the identified application. According to another aspect, a plurality of user inputs to the application is accepted at the user input device, recorded, and a code set selected based on the recorded plurality of user inputs.

According to another method aspect, a keycode set is adaptively selected in response to an application resident on a data processing system, the selected keycode set optimizing a performance parameter for communicating keycodes between a user input device and the application. A keystroke is accepted at the user input device and a keycode of the selected keycode set is communicated from the user input device to the application, wherein the communicated keycode corresponds to the accepted keystroke. The selected keycode set may be selected from a stored plurality of keycode sets. Preferably, the selected keycode set minimizes energy expended in communicating keycodes from the user input device to the data processing system. The selected keycode set may be selected in response to launching of the application.

According to another method aspect, a plurality of keycode sets is stored at the user input device. A keycode set is identified at the data processing system, and a message identifying the identified keycode set is communicated from the data processing system to the user input device. In response to a keystroke, a keycode from a keycode set of the plurality of keycode sets stored at the user input device which is identified in the communicated message is communicated. According to yet another method aspect, a plurality of keystrokes input to the application is accepted at the user input device. The keystrokes are recorded, and a keycode set which optimizes a performance parameter for communicating between the user input device and the application is selected based on the recorded keystrokes.

A system for communicating a user input to an application resident on a data processing system includes means, responsive to the application, for adaptively selecting a code set, the selected code set mapping to a set of user inputs, the selected code set optimizing a performance parameter for communicating between a user input device and the application. A user input device is provided which includes means for accepting a user input from a user. Means are provided, responsive to the means for accepting a user input and to the means for adaptively selecting a code set, for communicating a code from the selected code set which corresponds to the accepted user input, from the user input device to the application. The system may further include means for storing a plurality of code sets, and the means for adaptively selecting a code set may include means, responsive to the application and operatively associated with the means for storing a plurality of code sets, for adaptively selecting a code set from the stored plurality of code sets. Preferably, the means for adaptively selecting a code set includes means for selecting a code set which minimizes energy expended in communicating codes from the user input device to the data processing system.

According to one embodiment, the system includes means for identifying the application, and the means for adaptively selecting a code set includes means for selecting a code set from a plurality of predetermined code sets according to the identified application. According to another embodiment, the means for adaptively selecting a code set includes means for accepting a plurality of user inputs to the application at the user input device, and means, responsive to the means for accepting a plurality of user inputs, for recording the plurality of accepted user inputs. Means are provided, responsive to the means for recording the plurality of accepted user inputs, for selecting a code set which optimizes a performance parameter for communicating between the user input device and the application based on the recorded plurality of user inputs.

According to another embodiment, a system for communicating a user input to an application resident on a data processing system includes means, responsive to the application, for adaptively selecting a keycode set, the selected keycode sets mapping to a set of corresponding keystrokes, the selected keycode set optimizing a performance parameter for communicating between a user input device, e.g., a keyboard, keypad, or similar device, and the application. The system also includes a user input device including means for accepting a keystroke from a user. Means are provided, responsive to the means for accepting a keystroke and to the means for adaptively selecting a keycode set, for communicating a keycode of the selected keycode set which corresponds to the accepted keystroke, from the user input device to the application. The system may include means for storing a plurality of keycode sets, and the means for adaptively selecting a keycode set may include means, responsive to the application and operatively associated with the means for storing a plurality of keycode sets, for adaptively selecting a keycode set from the stored plurality of keycode sets. Preferably, the means for adaptively selecting a keycode set includes means for selecting a keycode set which minimizes energy expended in communicating keycodes from the user input device to the data processing system.

According to yet another aspect, a system for communicating a user input to an application includes a user input device, responsive to the application, which transmits a code in response to a user input, wherein the code is a member of a code set adaptively selected based on the application and wherein the selected code set optimizes a performance parameter for communicating information from the user input device to the application in response to a user input. A receiver, responsive to the user input device and operatively associated with the application, receives the transmitted code and relays the received code to the application. Preferably, the user input device transmits a code which is a member of a code adaptively selected to minimize energy expended in transmitting codes from the user input device.

A user input device for conveying a user input to an application according to the present invention includes means for accepting a user input, and means, responsive to the means for accepting a user input, for transmitting a corresponding code, wherein the code is a member of a code set adaptively selected based on the application and wherein the selected code set optimizes a performance parameter for communicating between the user input device and the application. Preferably, the means for transmitting includes means for transmitting a code which is a member of a code set adaptively selected to minimize energy expended in transmitting codes from the user input device. The user input device may include means for storing a plurality of code sets. Means may be provided for receiving a message identifying a code set, and the means for transmitting may include means, responsive to the means for receiving and to the means for storing a plurality of code sets, for transmitting a code from a stored code set identified in the received message. More efficient user input devices may thereby be provided.

BRIEF DESCRIPTION OF THE DRAWINGS

Some of the objects and advantages of the present invention having been stated, others will be more fully understood from the detailed description that follows and by reference to the accompanying drawings in which.

DETAILED DESCRIPTION OF THE PREFERRED EMBODIMENTS

The present invention now will be described more fully hereinafter with reference to the accompanying drawings, in which embodiments of the invention are shown. Those skilled in the art will appreciate that the invention may be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements throughout.

Figure 1:
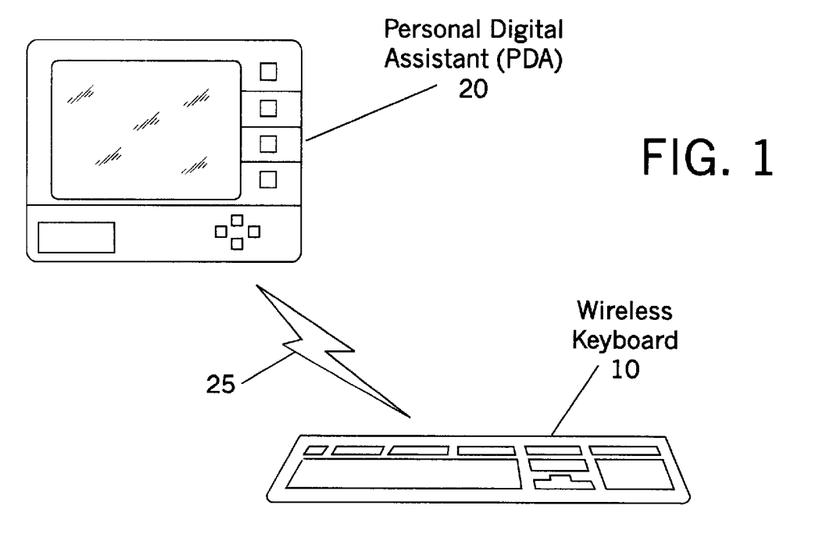
FIG. 1 is a schematic illustration of a keyboard and personal digital assistant in which the systems and methods of the present invention may be practiced.

FIG. 1 illustrates a user input device, e.g., a wireless keyboard 10, for providing user inputs to an application resident on a data processing system such as a personal digital assistant (PDA) 20. The keyboard 10 may be linked to the PDA 20 via an infrared link 25. Components of an infrared communications link which may be present but not shown, such as transmitters and receivers located in the keyboard 10 and the PDA 20, are well known to those skilled in the art, and need not be discussed in greater detail herein. Those skilled in the art will appreciate that although the discussion herein relates to infrared wireless keyboard applications, the systems and methods of the present invention are also applicable to other systems such as wired keyboards and wireless keyboards which use radio frequency, optical or other communications techniques. Those skilled in the art will also appreciate that the present invention is applicable to user input devices other than keyboards which may use codes to communicate user inputs, such as keypads, digitizers, light pens, bar-code readers, optical character readers, mouse-type devices, and the like.

Communications over the infrared link 25 may involve the transmission of bursts of infrared radiation separated by non-radiating intervals such that, for example, a burst represents a binary "0" and a non-radiating period represents a binary "1." Thus, for example, the infrared transmitter of the keyboard 10 may use more energy when transmitting a "0" than when transmitting a "1." If bytes or similar groupings of binary digits are used to represent various keycodes of a keycode set, the keycode set used to communicate between the keyboard 10 and the PDA 20 may have different energy consumption characteristics depending on the type of application with which the user is communicating.

For example, Table 1 illustrates the relative frequency of occurrence (in percent) of particular characters in English-language text, excluding case, control characters and punctuation (the percentages in the table may not sum to 100 percent due to rounding):

TABLE 1

| Char. | Freq. | Char. | Freq. | Char. | Freq. | Char. | Freq. | Char. | Freq. |
|---|---|---|---|---|---|---|---|---|---|
| e | 13 | r | 7 | c | 3 | g | 2 | x | 0.3 |
| t | 9 | s | 6 | m | 3 | b | 2 | z | 0.3 |
| a | 8 | h | 6 | p | 2 | v | 1 | | |
| o | 8 | d | 4 | f | 2 | j | 0.5 | | |
| n | 7 | l | 4 | y | 2 | k | 0.5 | | |
| i | 7 | u | 3 | w | 2 | q | 0.3 | | |

As can be seen from Table 1, in order to reduce energy consumption when communicating keystrokes from an English text application, e.g., an English-text word processing application, it may be desirable to utilize a keycode in which the keycodes that represent more frequently used characters such as "e" or "t" have fewer bits of value "0" than less frequently used characters such as "x" or "z" in order to minimize energy expended in transmitting these particular keycodes, as described in a United States Patent Application entitled "Method, Keyboard and System for Transmitting Key Characters" by Ramesh et al., assigned to the assignee of the present application and filed concurrently herewith.

However, the keyboard 10 and PDA 20 may be used for applications other than English-text word processing. For example, a spreadsheet application may be running on the PDA 20 which involves more numeric keyboard entry than alphabetic character entry. Consequently, a keycode which is optimized to reduce energy consumption during input to an English-text application may be less than optimal for data entry into the spreadsheet application. Therefore, according to the present invention, a different keycode set may be adaptively selected for use with the spreadsheet application which provides minimized energy consumption for the types of keystroke typically performed in the spreadsheet application.

Figure 2:
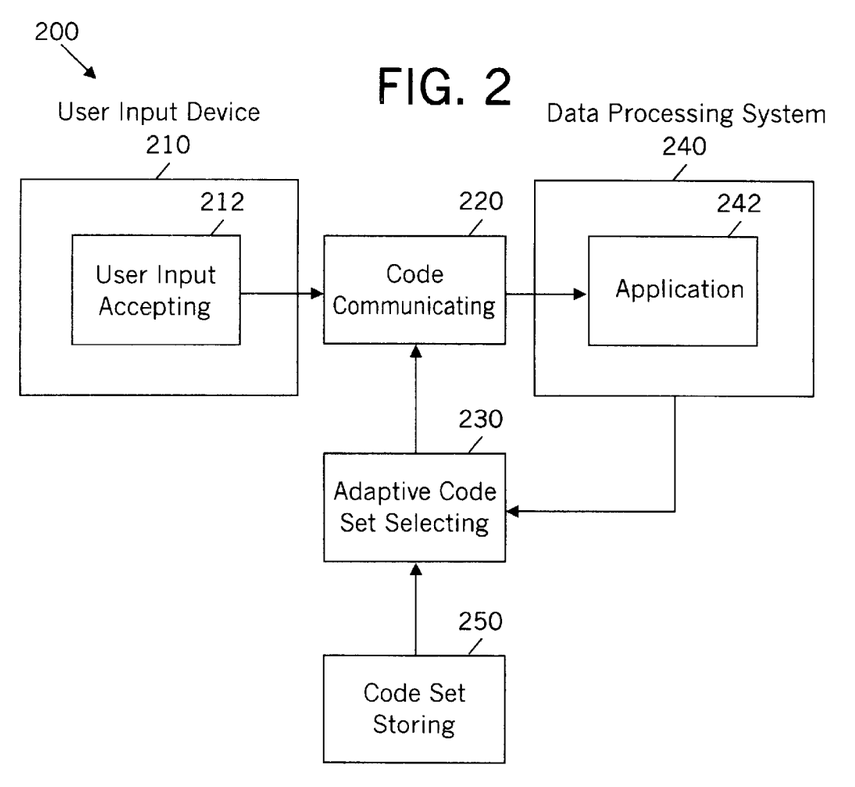
FIG. 2 is a schematic block diagram of a system for communicating user inputs to an application according to the present invention.

Referring to FIG. 2, a system 200 for communicating user inputs to an application 242 resident on a data processing system 240 includes a user input device 210 including means for accepting a user input 212. Means 220 for communicating a code corresponding to a user input are responsive to adaptive code set selecting means 230 for communicating a code which is a member of a code set selected by the adaptive code set selecting means 230. The adaptive code set selecting means 230 is operatively associated with the application 242 to select a code set, for example, from a plurality of code sets stored at code set storing means 250. The selected code set optimizes a performance parameter for communications between the user input device 210 and the application 242. Preferably, the selected code set minimizes energy expended in communicating codes from the user input device 210 to the data processing system 240.

Those skilled in the art will appreciate that the data processing system 240 may include a personal computer or similar computing device, and the user input device 210 may take the form of a wireless, e.g., infrared, keyboard, mouse or similar device which is used to provide user input into an application resident on the personal computer or other computing device. However, those skilled in the art will also realize that the data processing system 240 may also include other devices which perform data processing functions and which receive user inputs, such as televisions, video cassette recorders (VCRs), personal digital assistants (PDAs) or the like. Accordingly, the user input device 210 may also include devices commonly used to provide user inputs to such devices, such as remote control devices, joysticks and the like.

The code set may be selected in various ways. For example, a code set may be selected from a plurality of code sets stored in memory locations, e.g., as look-up tables. The memory locations may reside at the user input device 210, at the data processing system 240, or at both. The code set may also be selected in other ways, however. For example, a code set may be selected by employing code-generating algorithms.

Figure 3:
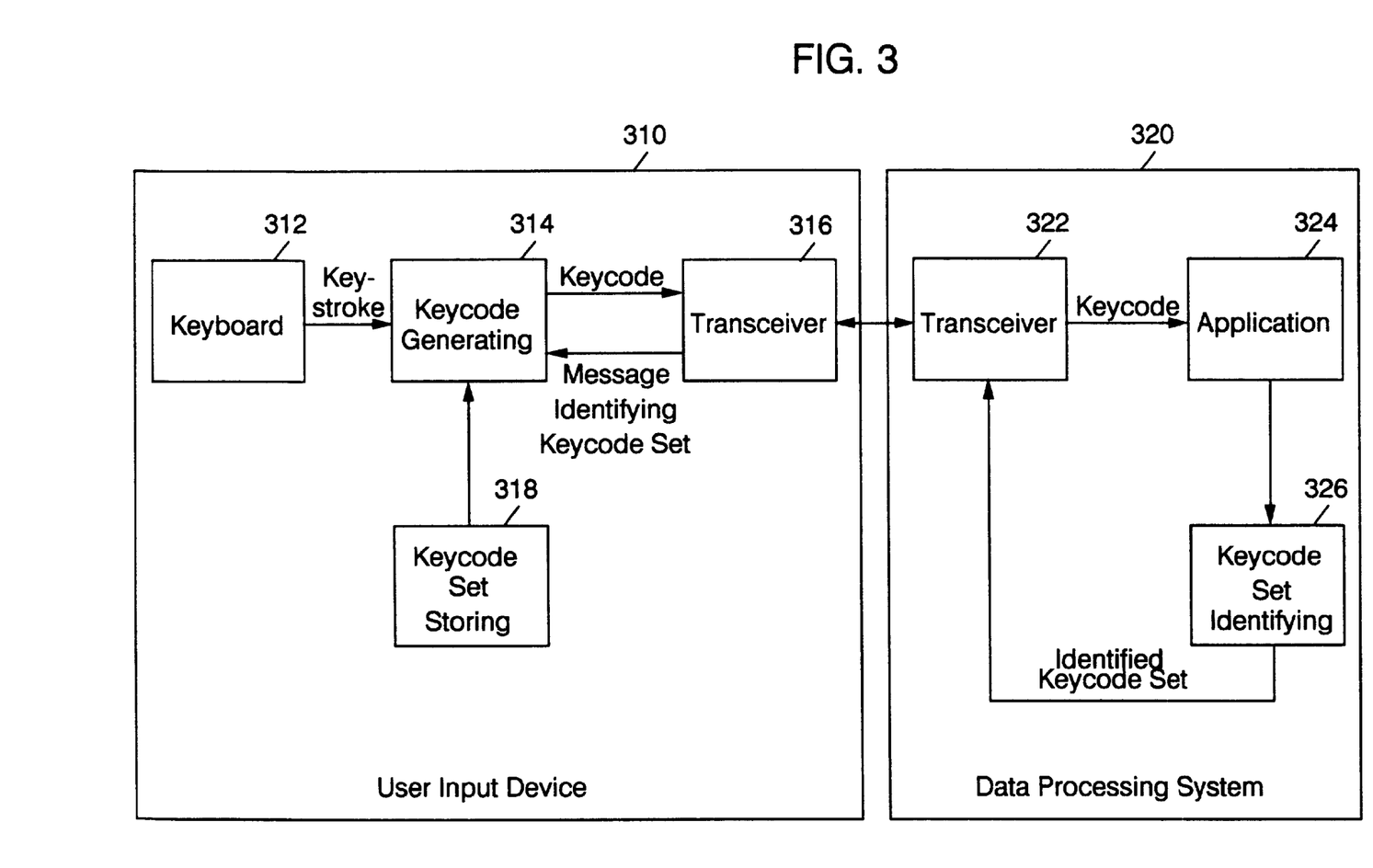
FIG. 3 is a schematic block diagram illustrating a first embodiment of a system for communicating user inputs to an application according to the present invention.

FIG. 3 illustrates an embodiment of a system for communicating user inputs, e.g., keystrokes, from a user input device 310 to an application 324 resident on a data processing system 320 according to the present invention. The user input device 310 includes means for accepting a keystroke, e.g., a keyboard 312. Means for communicating a corresponding keycode from the user input device 310 to the application 324 may include keycode generating means 314 which maps a keystroke into a keycode of a keycode set selected from a plurality of keycode sets stored by keycode set storing means 318. A first transceiver 316, such as an infrared or radio frequency transceiver, transmits the keycode from the user input device 310, and a second transceiver 322 located, for example, at the data processing system 320, receives the transmitted keycode and passes it on to the application 324. Means for selecting the keycode set used for communication between the user input device 310 and the data processing system 320 may include keycode set identifying means 326, which is responsive to the application 324 to identify a keycode based on the application 324. To inform the user input device of the keycode identified, the second transceiver 322 may transmit a message identifying the identified keycode set to the first transceiver 316 in the user input device 310 for use by the keycode generating means 314.

For the embodiment illustrated in FIG. 3, means for selecting the keycode set are resident at the data processing system 320, and the user input device 310 is informed of the selected keycode set by a message communicated from the data processing system 320. However, the location of the means for selecting a keycode set need not be constrained to the data processing system 320. For example, the means for selecting the keycode set may be incorporated in the user input device 310, which may in turn communicate a message to the data processing system 320 which identifies the selected keycode set. Other configurations for performing functions involved in adaptive selection of a keycode set for communication between the user input device 310 and the application 324, e.g., distributed configurations, may be used as well.

Figure 4:
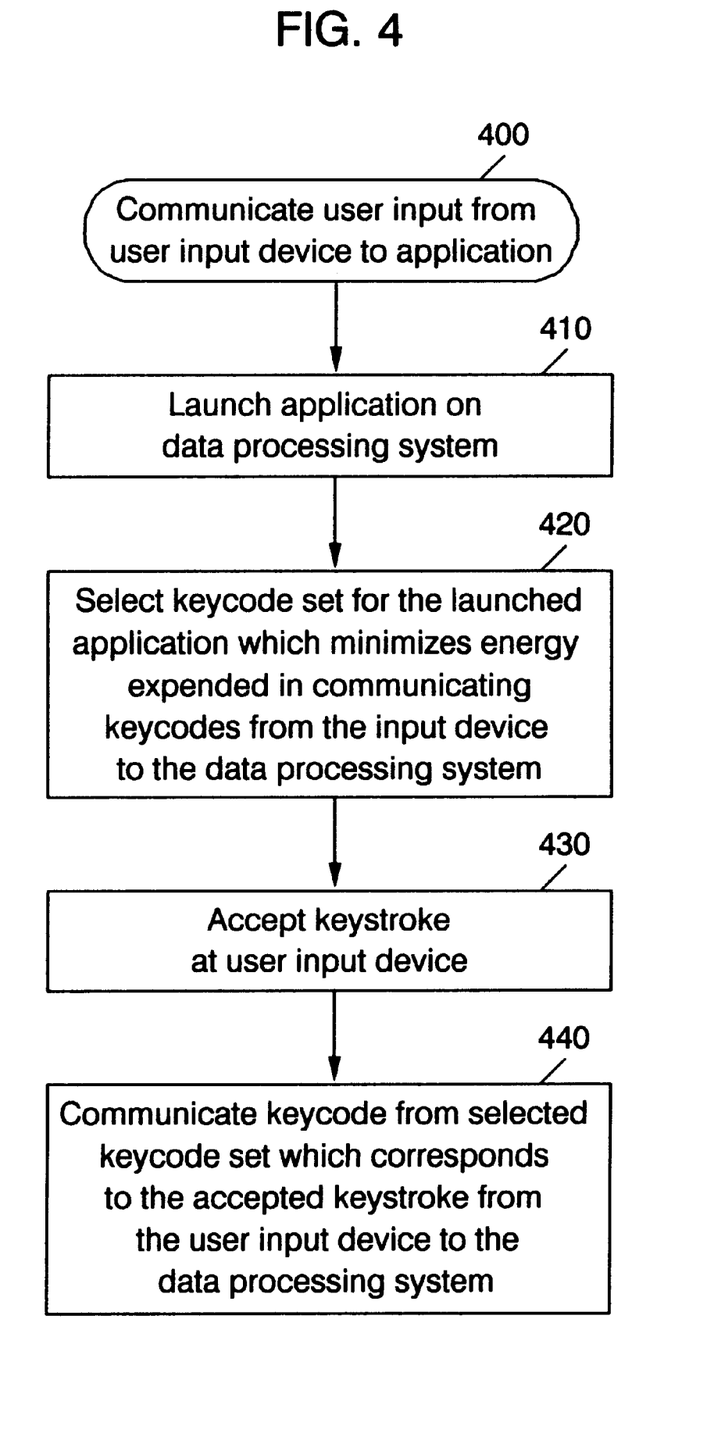
FIG. 4 is a flowchart illustration of operations for communicating a user input to an application according to a first method aspect of the present invention.

FIG. 4 illustrates a related first method aspect of the present invention. As illustrated, to communicate a user input from a user input device to an application resident on a data processing system (Block 400), the application is launched on the data processing system (Block 410). In response to launching of the application, a keycode set is then selected which minimizes energy expended in communicating keycodes from the user input device to the particular application (Block 420). Subsequently, a keystroke may be accepted at the user input device (Block 430), and then a corresponding keycode from the selected keycode set communicated from the user input device to the data processing system (Block 440).

Figure 5:
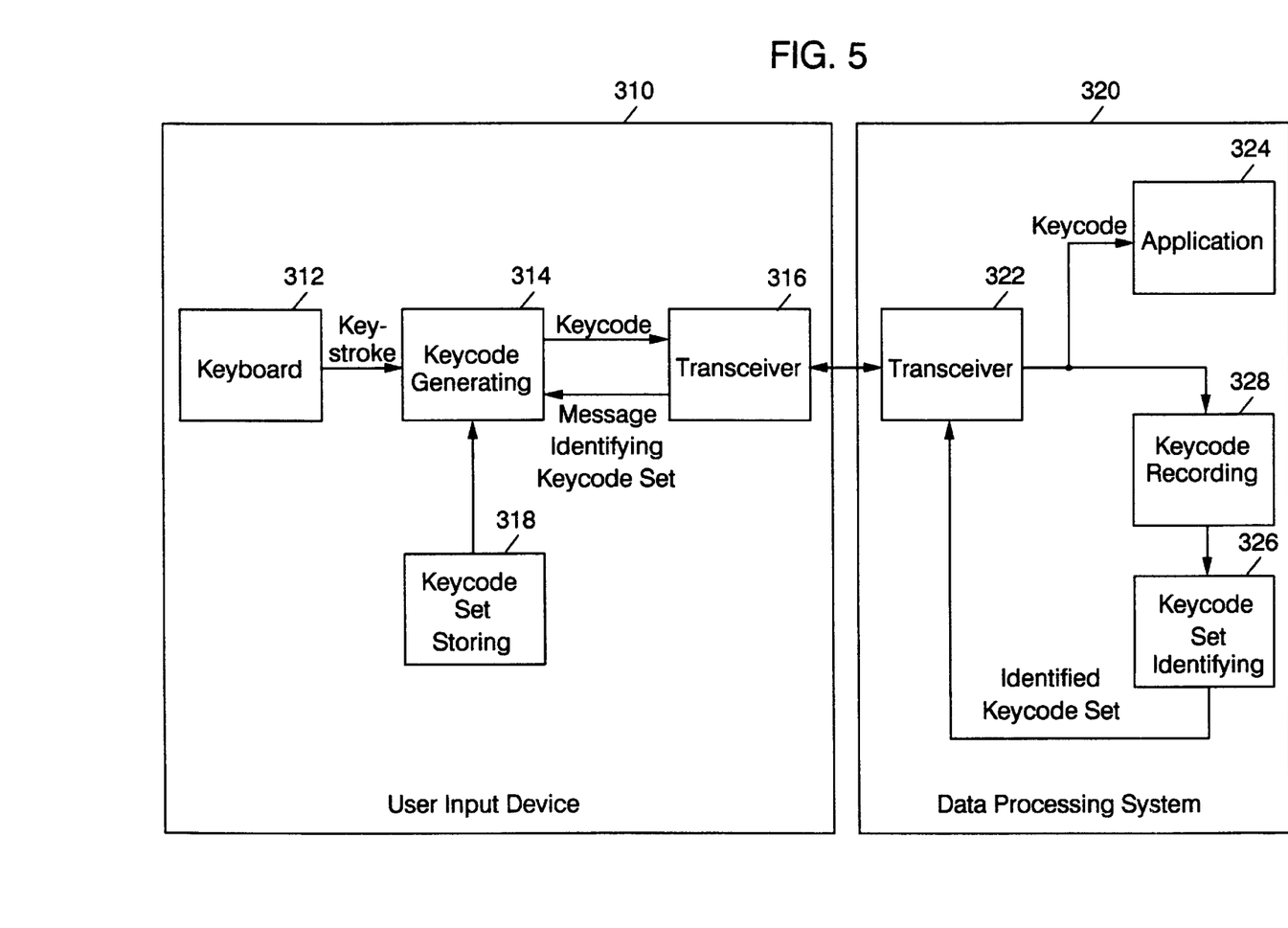
FIG. 5 is a schematic block diagram illustrating a second embodiment of a system for communicating a user input to an application according to the present invention.

FIG. 5 illustrates a second embodiment according to the present invention of a system for communicating user inputs from a user input device 310 to an application 324 resident on a data processing system 320 in which a keycode set is selected based on a record of keystrokes input into the user input device 310. Means for selecting the keycode set used for communication between the user input device 310 and the data processing system 320 may include means for recording keystrokes accepted at the user input device 310, e.g., keycode recording means 328 which is responsive to the second transceiver 322. The keycode set identifying means 326 may be responsive to the keycode recording means 328 to identify a keycode set based on the keycodes recorded.

Figure 6:
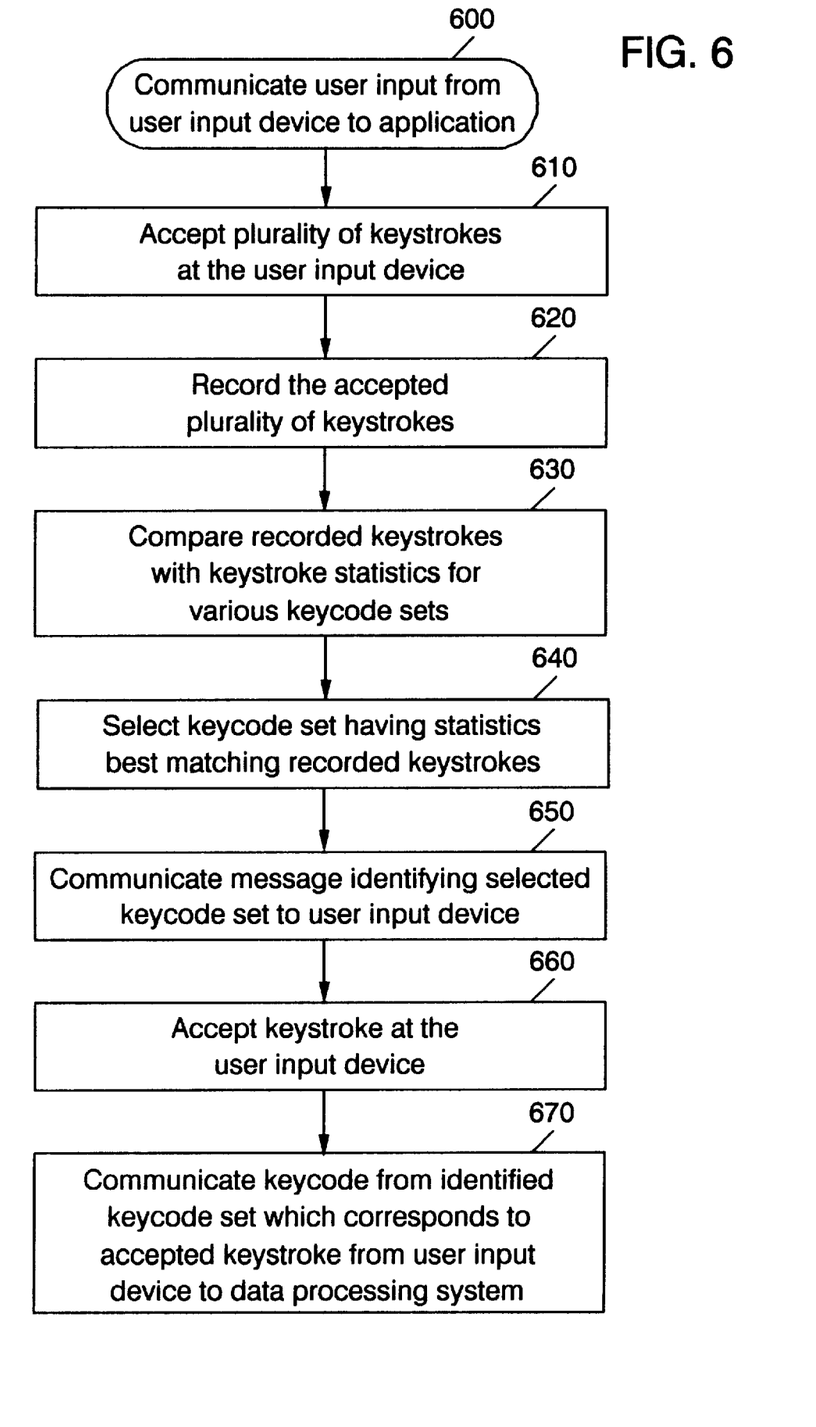
FIG. 6 is a flowchart illustration of operations for communicating a user input to an application according to a second method aspect of the present invention.

Operations (Block 600) for communicating a user input from a user input device to an application according to a related method aspect are illustrated in FIG. 6. A plurality of keystrokes is accepted at the user input device (Block 610) and recorded (Block 620), for example, by recording keycodes corresponding to the keystrokes. A keycode set is then selected by comparing the recorded keystrokes, for example, to keystroke statistics associated with various possible keycode sets which may be used to transmit keystrokes to an application (Block 630). The keycode set having statistics which best match the recorded keystrokes may then be selected for subsequent keycode transmissions (Block 640), and a message identifying the selected keycode set may then be communicated to the user input device, e.g., the wireless keyboard (Block 650). A keystroke may then subsequently be accepted (Block 660) at the input device and a corresponding keycode from the selected keycode set used to represent the accepted keystroke (Block 670).

Those skilled in the art will appreciate that the means described in reference to FIGS. 2, 3 and 5 may be implemented in a number of ways, including special purpose hardware, software running on special purpose or general purpose data processing apparatus, or combinations thereof. Those skilled in the art will also appreciate that the flowchart illustrations of FIGS. 4 and 6 illustrate methods, apparatus (systems) and computer program products according to the invention. It will be understood that each block of the flowchart illustrations, and combinations of blocks in the flowchart illustrations, can be implemented by computer program instructions which may be loaded onto a computer or other programmable data processing apparatus to produce a machine such that the instructions which execute on the computer or other programmable data processing apparatus create means for implementing the functions specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks. Accordingly, blocks of the flowchart illustration support combinations of means for performing the specified functions and combinations of steps for performing the specified functions. It will also be understood that each block of the flowchart illustrations, and combinations of blocks in the flowchart illustrations, can be implemented by special purpose hardware-based computer systems which perform the specified functions or steps, or combinations of special purpose hardware and computer instructions.

Those skilled in the art will appreciate that the present invention may be embodied in a number of different ways besides the embodiments described above. For example, the adaptive keycode set identifying means 326 of FIGS. 3 and 5 may be located at the user input device 310 instead of at the data processing system 320. Those skilled the art will also appreciate that multiple communications links may be present between the user input device and an application, and that the code set selected may be selected so as to optimize communications, e.g., energy consumption, over any one of or all of the communications links. It will also be understood that the keycode selected may also be selected to optimize other performance parameters such as error rate, and that the selected code may be chosen to optimize a combination of parameters. For example, the selected code may represent an optimization in terms of energy consumption and error rate.

In the drawings and specification, there have been disclosed typical embodiments of the invention and, although specific terms are employed, they are used in a generic and descriptive sense only and not for purposes of limitation, the scope of the invention being set forth in the following claims.

That which is claimed is:

1. A method of communicating a user input to an application resident on a data processing system, the method comprising the steps of:

adaptively selecting a code set in response to the application, the selected code set mapping to a set of corresponding user inputs, the selected code set optimizing energy expended in communicating between a user input device and the application;

accepting a user input at the user input device; and communicating a code from the selected code set from the user input device to the application, wherein the communicated code corresponds to the accepted user input.

2. A method according to claim 1, wherein said step of adaptively selecting comprises the step of adaptively generating the selected code set.

3. A method according to claim 1, wherein said step of adaptively selecting a code set comprises the step of selecting a code set which minimizes energy expended in communicating codes from the user input device to the data processing system.

4. A method according to claim 1:

wherein said step of adaptively selecting a code set is preceded by the step of identifying the application; and wherein said step of adaptively selecting a code set comprises the step of selecting a code set according to the identified application.

5. A method according to claim 1, wherein said step of adaptively selecting a code set comprises the step of adaptively selecting a code set at the user input device, and further comprising the step of communicating a message identifying the selected code set from the user input device to the data processing system.

6. A method according to claim 1:

wherein said step of adaptively selecting is preceded by the step of storing a plurality of code sets; and wherein said step of adaptively selecting comprises the step of selecting a code set from the stored plurality of code sets.

7. A method according to claim 6;

wherein said step of storing comprises the step of storing a plurality of code sets at the user input device; and wherein said step of communicating a code comprises the step of communicating a code from one of the plurality of codes sets stored at the user input device.

8. A method according to claim 1, wherein said step of adaptively selecting a code set comprises the steps of:

accepting a plurality of user inputs to the application at the user input device;

recording the plurality of accepted user inputs; and selecting a code set which optimizes energy expended in communicating between the user input device and the application based on a frequency of occurrence of a user input in the recorded plurality of user inputs.

9. A method according to claim 8, wherein said step of selecting a code set which optimizes a performance parameter comprises the step of selecting a code set which minimizes energy expended in communicating codes from the user input device to the data processing system.

10. A method of communicating a user input to an application resident on a data processing system, the method comprising the steps of:

adaptively selecting a keycode set in response to the application, the selected keycode set mapping to a respective set of corresponding keystrokes, the selected keycode set optimizing energy expended in communicating keycodes between a user input device and the application;

accepting a keystroke at the user input device; and communicating a keycode of the selected keycode set from the user input device to the application, wherein the communicated keycode corresponds to the accepted keystroke.

11. A method according to claim 10, wherein said step of adaptively selecting comprises the step of adaptively generating the selected keycode set.

12. A method according to claim 10, wherein said step of adaptively selecting a keycode set comprises the step of selecting a keycode set which minimizes energy expended in communicating keycodes from the user input device to the data processing system.

13. A method according to claim 10:

wherein said step of adaptively selecting a keycode set is preceded by the step of identifying the application; and wherein said step of adaptively selecting a keycode set comprises the step of selecting a keycode set according to the identified application.

14. A method according to claim 13:

wherein said step of adaptively selecting a keycode set is preceded by the step of launching an application on the data processing system; and wherein said step of adaptively selecting a keycode set comprises the step of selecting a keycode set for the launched application in response to launching of the application.

15. A method according to claim 10, wherein said step of adaptively selecting a keycode set comprises the steps of:

accepting a plurality of keystrokes input to the application at the user input device;

recording the accepted plurality of keystrokes; and selecting a keycode set which optimizes energy expended in communicating between the user input device and the application based on a frequency of occurrence of a keystroke in the recorded keystrokes.

16. A method according to claim 15, wherein said step of selecting a keycode set which optimizes a performance parameter comprises the step of selecting a keycode set which minimizes energy expended in communicating keycodes from the user input device to the data processing system.

17. A method according to claim 10:

wherein said step of adaptively selecting is preceded by the step of storing a plurality of keycode sets; and wherein said step of adaptively selecting comprises the step of selecting a keycode set from the stored plurality of keycodes sets.

18. A method according to claim 17:

wherein said step of storing a plurality of keycode sets comprises the step of storing a plurality of keycode sets at the user input device; and wherein said step of communicating a keycode comprises the step of communicating a keycode from a keycode set of the plurality of keycode sets stored at the user input device.

19. A method according to claim 18:

wherein said step of selecting a keycode set comprises the step of identifying a keycode set at the data processing system;

wherein said step of communicating a keycode is preceded by the step of communicating a message identifying the identified keycode set from the data processing system to the user input device; and wherein said step of communicating a keycode comprises the step of communicating a keycode from a keycode set of the plurality of keycode sets stored at the user input device which is identified in the communicated message.

20. A system for communicating a user input to an application resident on a data processing system, the system comprising:

means, responsive to the application, for adaptively selecting a code set, the selective code set mapping to a set of user inputs, the selected code set optimizing energy expended in communicating between a user input device and the application;

a user input device including means for accepting a user input from a user; and means, responsive to said means for accepting a user input and to said means for adaptively selecting a code set, for communicating a code from the selected code set which corresponds to the accepted user input from said user input device to the application.

21. A system according to claim 20, wherein said means for adaptively selecting comprises means for adaptively generating the selected code set.

22. A system according to claim 20, further comprising means for storing a plurality of code sets, and wherein said means for adaptively selecting a code set comprises means, responsive to the application and operatively associated with said means for storing a plurality of code sets, for adaptively selecting a code set from the stored plurality of code sets.

23. A system according to claim 20, wherein said means for adaptively selecting a code set comprises means for selecting a code set which minimizes energy expended in communicating codes from said user input device to the data processing system.

24. A system according to claim 20, further comprising means for identifying the application, and wherein said means for adaptively selecting a code set comprises means for selecting a code set according to the identified application.

25. A system according to claim 20, wherein said user input device includes means for storing a plurality of code sets; and wherein said means for communicating a code comprises means for communicating a code from one of the plurality of codes sets stored at the user input device.

26. A system according to claim 20, wherein said user input device includes means for adaptively selecting a code set, and further comprising means for communicating a message identifying the selected code set from said user input device to the data processing system.

27. A system according to claim 20, wherein said means for adaptively selecting a code set comprises:

means for accepting a plurality of user inputs to the application at said user input device;

means, responsive to said means for accepting a plurality of user inputs, for recording the plurality of accepted user inputs; and means, responsive to said means for recording the plurality of accepted user inputs, for selecting a code set which optimizes energy expended in communicating between said user input device and the application based on a frequency of occurrence of a user input in the recorded plurality of user inputs.

28. A system according to claim 27, wherein said means for selecting a code set which optimizes a performance parameter comprises means for selecting a code set which minimizes energy expended in communicating codes from said user input device to the data processing system.

29. A system for communicating a user input to an application resident on a data processing system, the system comprising:

means, responsive to the application, for adaptively selecting a keycode set, the selected keycode set mapping to a set of corresponding keystrokes, the selected keycode set optimizing energy expended in communicating between a user input device and the application;

a user input device including means for accepting a keystroke from a user; and means, responsive to said means for accepting a keystroke and to said means for adaptively selecting a keycode set, for communicating a keycode of the selected keycode set which corresponds to the accepted keystroke, from said user input device to the application.

30. A system according to claim 29, wherein said means for adaptively selecting a keycode set comprises means for adaptively generating the selected keycode set.

31. A system according to claim 29, further comprising means for storing a plurality of keycode sets, and wherein said means for adaptively selecting a keycode set comprises means, responsive to the application and operatively associated with said means for storing a plurality of keycode sets, for adaptively selecting a keycode set from the stored plurality of keycode sets.

32. A system according to claim 29, wherein said means for adaptively selecting a keycode set comprises means for selecting a keycode set which minimizes energy expended in communicating keycodes from said user input device to the data processing system.

33. A system according to claim 29, further comprising means for identifying the application, and wherein said means for adaptively selecting a keycode set comprises means for selecting a keycode set according to the identified application.

34. A system according to claim 29, further comprising means for launching an application on the data processing system, and wherein said means for selecting a keycode set comprises means, responsive to said means for launching an application, for selecting a keycode set for the launched application.

35. A system according to claim 29:

wherein said user input device comprises means for storing a plurality of keycode sets; and wherein said means for communicating a keycode comprises means for communicating a keycode from a keycode set of the plurality of keycode sets stored at the user input device.

36. A system according to claim 35, wherein said means for selecting a keycode set comprises means for identifying a keycode set at the data processing system, wherein the system further comprises means for communicating a message identifying the identified keycode set from the data processing system to said user input device, and wherein said means for communicating a keycode comprises means for communicating a keycode from a keycode set of the plurality of keycode sets stored at said user input device which is identified in the communicated message.

37. A system according to claim 29, wherein said means for adaptively selecting a keycode set comprises:

means for accepting a plurality of keystrokes at said user input device;

means, responsive to said means for accepting, for recording the accepted plurality of keystrokes; and means, responsive to said means for recording, for selecting a keycode set which optimizes energy expended in communicating between said user input device and the application based on a frequency of occurrence of a keystroke in the recorded keystrokes.

38. A system according to claim 37, wherein said means for selecting a keycode set which optimizes a performance parameter comprises means for selecting a keycode set which minimizes energy expended in communicating keycodes from said user input device to the data processing system.

39. A system for communicating a user input to an application, the system comprising:

a user input device, responsive to the application, which transmits a code in response to a user input, wherein the code is a member of a code set adaptively selected based on the application and wherein the selected code set optimizes energy expended in communicating information from said user input device to the application in response to a user input; and a receiver, responsive to said user input device and operatively associated with the application, which receives the transmitted code and relays the received code to the application.

40. A system according to claim 39, further comprising a transmitter, responsive to the application, which transmits a message identifying a code set, and wherein said user input device is responsive to receive the message identifying a code set and transmits a code which is a member of the keycode set identified in the received message in response to a user input.

41. A system according to claim 39, wherein said user input device transmits a code which is a member of a code adaptively selected to minimize energy expended in transmitting codes from said user input device.

42. A user input device for conveying a user input to an application, the user input device comprising:

means for accepting a user input; and means, responsive to said means for accepting a user input, for transmitting a corresponding code, wherein the code is a member of a code set adaptively selected based on the application and the selected code set optimizes energy expended in communicating between the user input device and the application.

43. A device according to claim 42, wherein said means for accepting a user input comprises a key.

44. A device according to claim 42, wherein said means for transmitting comprises means for transmitting a code which is a member of a code set adaptively selected to minimize energy expended in transmitting codes from the user input device.

45. A device according to claim 42, further comprising:

means for storing a plurality of code sets; and means for receiving a message identifying a code set; and wherein said means for transmitting comprises means, responsive to said means for receiving and to said means for storing a plurality of code sets, for transmitting a code from a stored code set identified in the received message.

46. A method of communicating between a user input device and a data processing system that hosts an application, the method comprising the steps of:

identifying a plurality of code sets, each of which are operative to communicate user inputs for the application between the user input device and the data processing system; and communicating between the user input device and the data processing system using a selected code set of the plurality of code sets when providing user inputs to the application, wherein the selected code set is selected based on a performance parameter associated with communication of codes corresponding to user inputs to the application between the user input device and the data processing system.

47. A method according to claim 46, wherein said step of communicating is preceded by the steps of:

identifying the application; and selecting the selected code set responsive to identification of the application.

48. A method according to claim 46, wherein said step of communicating is preceded by the steps of:

recording a plurality of user inputs to the application; and selecting the selected code set based on a frequency of occurrence of a user input in the recorded plurality of user inputs.

49. A method according to claim 46, wherein said step of communicating is preceded by the step of communicating a message identifying the selected code from the user input device to the data processing system.

50. A method according to claim 46, wherein the user input device comprises a keyboard and wherein the plurality of code sets comprises a plurality of keycode sets, a respective keycode of a keycode set mapping to a respective keystroke.

51. A method according to claim 46, wherein the selected code set optimizes the performance parameter.

52. A method according to claim 51, wherein the performance parameter comprises at least one of an error rate and an energy expended in communicating codes corresponding to user inputs to the application between the user input device and the application.

53. A system for providing user inputs to a data processing system that hosts an application, the system comprising:

a user input device operative to communicate user inputs to the data processing system using a plurality of code sets, each of which may be used to communicate user inputs for the application, wherein the user input device, when providing user inputs to the application, communicates with the data processing system using a code set selected based on a performance parameter associated with communication of codes corresponding to the user inputs.

54. A system according to claim 53, wherein said user input device comprises:

means, responsive to the data processing system, for identifying the application; and means for selecting the selected code set responsive to identification of the application.

55. A system according to claim 53, further comprising:

means for recording a plurality of user inputs to the application; and mean, responsive to said means for recording, for selecting the selected code set based on a frequency of occurrence of a user input in the recorded plurality of user inputs.

56. A system according to claim 53, wherein said user input device comprises means for transmitting a message identifying the selected code to the data processing system.

57. A system according to claim 53, wherein said user input device comprises a keyboard and wherein the plurality of code sets comprises a plurality of keycode sets, a respective keycode of a keycode set mapping to a respective keystroke.

58. A system according to claim 53, wherein the selected code set optimizes the performance parameter.

59. A system according to claim 58, wherein the performance parameter comprises at least one of an error rate and an energy expended in communicating codes corresponding to user inputs to the application between the user input device and the application.

* * * * *